United States Patent
Moorby

(12)
(10) Patent No.: US 6,192,156 B1
(45) Date of Patent: Feb. 20, 2001

(54) FEATURE TRACKING USING A DENSE FEATURE ARRAY

(75) Inventor: Philip R. Moorby, Boxford, MA (US)

(73) Assignee: Synapix, Inc., Lowell, MA (US)

( * ) Notice: Under 35 U.S.C. 154(b), the term of this patent shall be extended for 0 days.

(21) Appl. No.: 09/054,866

(22) Filed: Apr. 3, 1998

(51) Int. Cl.$^7$ .............................. G06K 9/00; G06K 9/46; H04N 5/225; H04N 7/12

(52) U.S. Cl. ........................ 382/236; 382/103; 382/107; 382/239; 382/240; 348/169; 348/416.1

(58) Field of Search .................................. 382/103, 107, 382/190, 236, 239, 240, 181; 348/169, 171, 699, 416.1

(56) References Cited

U.S. PATENT DOCUMENTS

| | | | |
|---|---|---|---|
| 5,282,255 | * 1/1994 | Bovik et al. | 382/239 |
| 5,673,339 | 9/1997 | Lee | 382/236 |
| 5,802,220 | * 9/1998 | Black et al. | 382/276 |
| 5,864,630 | * 1/1999 | Cosatto et al. | 382/103 |
| 5,936,671 | * 8/1999 | Van Beek et al. | 348/413 |
| 5,982,909 | * 11/1999 | Erdem et al. | 382/103 |

FOREIGN PATENT DOCUMENTS

97/00498    1/1997   (WO) .

OTHER PUBLICATIONS

Huang, et al. "a new motion compensation method for image sequence coding using hierarchical grid interpolation", IEEE, pp. 42–52, 1994.*

Bascle, et al. "tracking complex primitives in an image sequence", IEEE, pp. 426–431, 1994.*

Burt "multiresolution techniques for image representation, analysis, amd 'smart' transmission", SPIE, pp. 2–15, 1989.*

Wang, et al. "active mesh–a feature seeking and tracking image sequence representation scheme", pp. 610–624, 1994.*

Bergen, et al. "hierarchical model–based motion estimation", pp. 3–20, computer vision, 1992.*

Wohn, et al. "pyramid–based estimation 2–D motion for object tracking", IEEE, pp. 687–693, 1990.*

Qinfen Zheng, et al., "Balloon Motion Estimation Using Two Frames," Proceedings of the Asilomar Conference on Signals, Systems and Computers, Pacific Grove, Nov. 4–6, 1991, vol. 2, No. Conf. 25, Nov. 4, 1991, XP000314508, pp. 1057–1061.

Kouta Fujimura, et al., "Motion Analysis of Nonrigid Objects by Active Contour Models Using Multiscale Images," *Systems and Computers in Japan*, vol. 25, No. 2, Feb. 1, 1994, XP000474633, pp. 81–91.

\* cited by examiner

*Primary Examiner*—Phuoc Tran
*Assistant Examiner*—Daniel G. Mariam
(74) *Attorney, Agent, or Firm*—Hamilton, Brook, Smith & Reynolds, P.C.

(57) ABSTRACT

A method for feature tracking across a plurality of related image frames by developing a dense array of features and their paths as a deformable, regularly spaced grid, with vectors for each nodal feature point in the grid being derived through a process related to optical flow. The resulting dense feature array can be applied to techniques such as tracking two-dimensional shapes across frames, estimating three-dimensional paths of selected feature points, estimating three-dimensional camera paths from multiple feature points, or recovering estimated three-dimensional scene structure (including estimated depths of object surfaces) from feature tracking data.

12 Claims, 8 Drawing Sheets

FEATURE TRACKING USING A DENSE FEATURE ARRAY

BACKGROUND

Feature tracking, an image processing function, is the process of selecting features from an image and then tracking these features across multiple related images of the same visual scene. Each image is typically represented as an array of pixel values, and a feature in such an image is typically identified as a region of one or more pixels (or sub-pixels). The tracking defines the feature's path from image to image as a two-dimensional path in image coordinates. Tracking data can be further processed to generate an estimated path of the feature in three dimensions, based on the position of the feature and/or changes in camera position across frames in the original visual scene.

Feature tracking is the basis for several techniques whereby multiple feature points are simultaneously tracked across related image frames. These include techniques for tracking two-dimensional shapes across frames, for estimating three-dimensional paths of selected feature points, for estimating three-dimensional camera paths from multiple feature points, or for recovering estimated three-dimensional scene structure (including estimated depths of object surfaces) from feature tracking data. The use of feature tracking techniques in these applications can be very powerful, because they transform an image processing problem into a domain where the tools of geometry and knowledge of geometric constraints can be applied.

With standard feature tracking methods, the process generally follows these steps:

feature point selection: one or more feature points are selected in an initial image frame frame-to-frame tracking: each feature point is individually tracked through successive frames individual path estimation: the path for each feature point is estimated from its tracking data In frame-to-frame tracking of individual feature points, some common problems are initial selection sensitivity, lost features, broken paths, and bad matches.

Most feature tracking methods are highly sensitive to the initial selection of each feature point. Automated selection is typically done on criteria applied solely to the initial frame (such as choosing an area of high contrast). This selection can easily prove to be a poor choice for tracking in successive frames. Likewise, a manual selection made by a human operator may not be well suited for tracking over multiple frames.

When features are tracked independently, selection sensitivity becomes critical. Even when multiple features can be correlated and tracked as a group, reducing selection sensitivity depends on tracking all the features across multiple image frames while maintaining the correlation between them.

A feature can be "lost" due to imaging artifacts such as noise or transient lighting conditions. These artifacts can make it difficult or impossible to distinguish the feature identified in one frame from its surroundings in another frame. A feature can also be lost when it is visible in one frame but occluded (or partially occluded) in another. Feature occlusion may be due to changing camera orientation, and/or movement of one or more object(s) in the visual scene.

A lost feature can re-appear in yet another frame, but not be recognized as a continuation of a previously identified feature. This feature might be ignored, and remain lost. It may instead be incorrectly identified and tracked as an entirely new feature, creating a "broken path".

A broken path has two (or more) discontinuous segments such that one path ends where the feature was lost, and the next path begins where the feature re-appears. A single feature may therefore be erroneously tracked as multiple unrelated and independent features, each with its own unique piece of the broken path.

All the conditions that lead to a lost feature can also contribute to a "bad match". A bad match is a feature identified in one frame that is incorrectly matched to a different feature in another frame. A bad match can be even more troublesome than a lost feature or broken path, since the feature tracking algorithm proceeds as if the feature were being correctly tracked.

Some of the problems introduced by selection sensitivity, lost features, broken paths and bad matches can be addressed by adding a predictive framework into the feature tracking algorithm. A predictive framework can identify the most likely areas for matching a feature in successive frames. This can help reduce the number of lost features and bad matches, and also help to properly identify a feature that re-appears after being lost.

One predictive technique is to extrapolate the estimated path of each feature being tracked. But the predictive value of individual path extrapolation is problematic, particularly when the path has a limited number of data points. Errors can be reduced if the paths of multiple feature points can be correlated within the predictive model, and enough feature points are tracked and correlated across multiple frames. Information about relative camera positions between frames can assist in guiding and constraining the predictive model, but only if such information is available or can be reliably estimated.

The theoretical power of feature tracking methods has been demonstrated in experimental results and field trials, particularly in applications that derive higher-level scene information by tracking and correlating multiple feature points. But the limitations of current feature tracking methods, as discussed above, reduce their utility in many practical settings. A feature tracking method that substantially increases the number of feature points being simultaneously tracked, and tracks them within a constrained predictive framework, would greatly improve the utility of feature tracking within many application areas.

SUMMARY OF THE INVENTION

The invention is a method for feature tracking across a plurality of related image frames. Instead of selecting and tracking individual feature points from one image frame to the next, this technique recovers a dense array of features and their paths as a deformable grid, with vectors for each nodal point derived through techniques closely related to optical flow. Feature points are then selected individually or in groups from the dense feature array, and their paths across multiple frames estimated in either a two-dimensional or three-dimensional space.

The dense feature array method can be applied to either time-based sequences of image frames, to image frames captured from two or more cameras (stereo or multi-baseline stereo), or to time-based sequences of image frames from stereo or multi-baseline stereo cameras.

The resulting dense feature array can be applied to techniques such as tracking two-dimensional shapes across frames, estimating three-dimensional paths of selected feature points, estimating three-dimensional camera paths from multiple feature points, or recovering estimated three-dimensional scene structure (including estimated depths of object surfaces) from feature tracking data.

The dense feature array method is not constrained to image frames represented by rectangular arrays of pixels. It can be applied to segmented areas of such frames, or to any other pixel-oriented image representations. The method does require at least two images with some overlap between their coverage of the same visual scene. The visual scene can be a physical scene taken by a camera or other physical imaging device, or a synthetic scene rendered by a computer-based system.

The benefits of applying a dense feature array according to the invention include:

increased efficiency, by calculating multiple feature points and paths in a unified method and allowing additional feature points and their paths to be interpolated rather than computed;

greater accuracy, by using a larger number of feature points and their paths;

higher performance, by processing image frames in a pair-wise parallel fashion using a pyramid technique amenable to pipelined or even real-time operation; and improved robustness and reduced selection sensitivity, by using pyramid techniques and averaging over local neighborhoods to both guide and constrain feature tracking.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
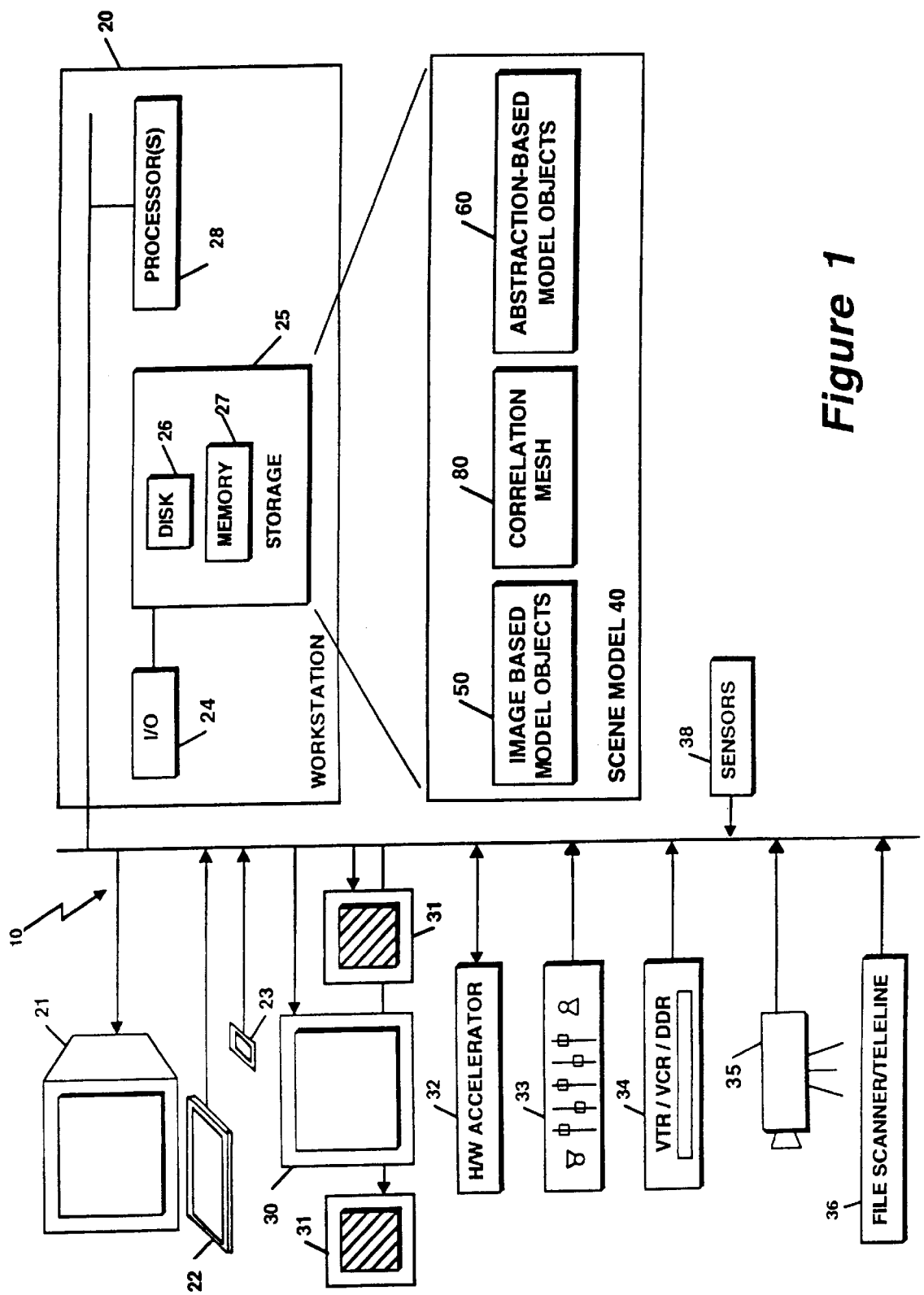
FIG. 1 is a block diagram of an image processing system which develops a dense feature array according to the invention.

Turning attention now in particular to the drawings, FIG. 1 is a block diagram of the components of a digital image processing system 10 according to the invention. The system 10 includes a computer workstation 20, a computer monitor 21, and input devices such as a keyboard 22 and mouse 23. The workstation 20 also includes input/output interfaces 24, storage 25, such as a disk 26 and random access memory 27, as well as one or more processors 28. The workstation 20 may be a computer graphics workstation such as the 02/Octane sold by Silicon Graphics, Inc., a Windows NT type-work station, or other suitable computer or computers. The computer monitor 21, keyboard 22, mouse 23, and other input devices are used to interact with various software elements of the system existing in the workstation 20 to cause programs to be run and data to be stored as described below.

The system 10 also includes a number of other hardware elements typical of an image processing system, such as a video monitor 30, audio monitors 31, hardware accelerator 32, and user input devices 33. Also included are image capture devices, such as a video cassette recorder (VCR), video tape recorder (VTR), and/or digital disk recorder 34 (DDR), cameras 35, and/or film scanner/telecine 36. Sensors 38 may also provide information about the scene and image capture devices.

Figure 2:
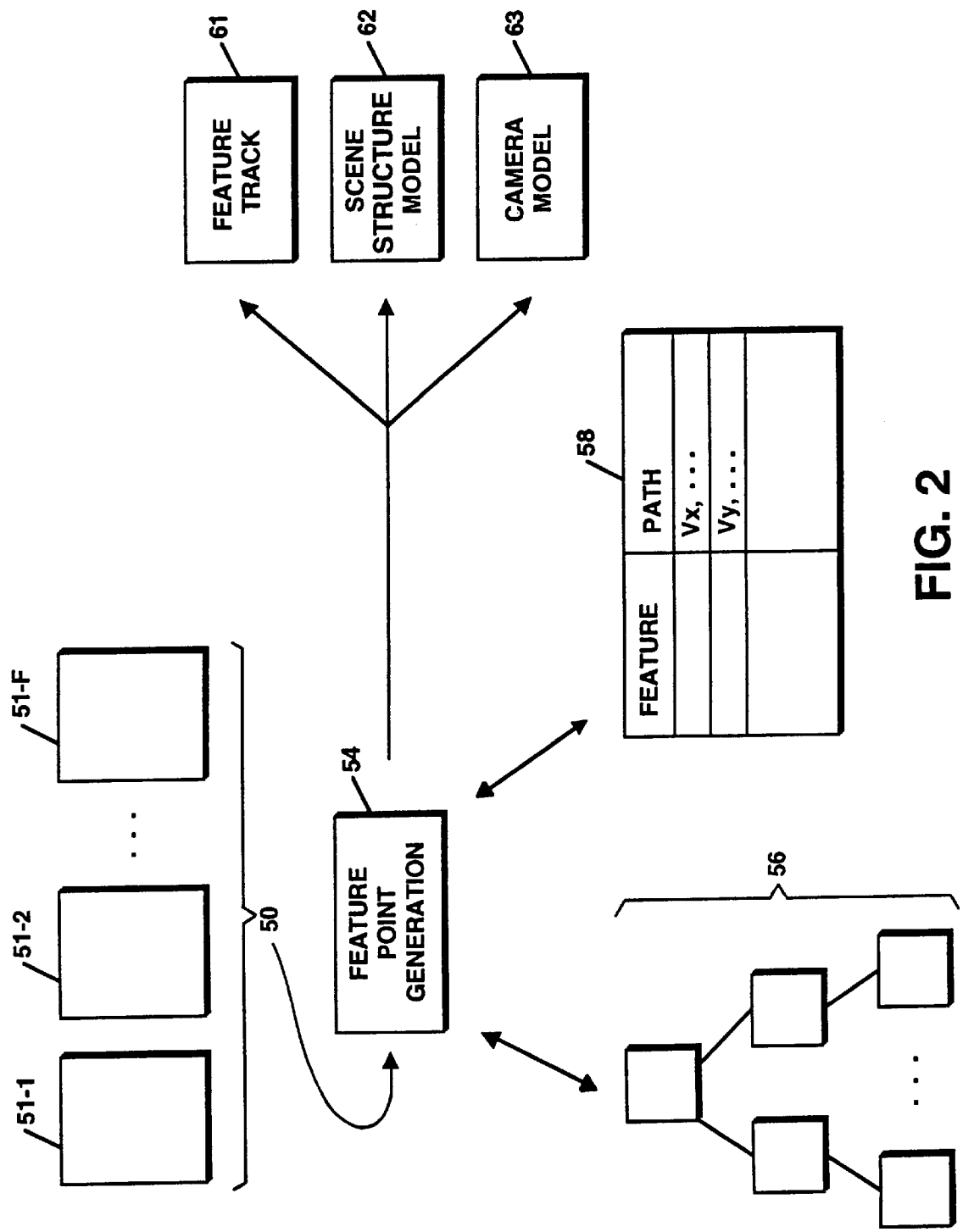
FIG. 2 is a process flow diagram illustrating how a sequence of images are processed by the featured tracking algorithm to produce a dense array of feature points.

The present invention is concerned with a technique for generating an array of feature points from a sequence of images provided by one of the image capture devices. As shown in FIG. 2, a sequence 50 of images 51-1, 51-2, ..., 51-F are provided to a feature point generation process 54. The invention is concerned, in particular, with the details of the feature point generation process 54 and a technique for developing an image pyramid 56 from which a dense array of feature points 58 may be determined.

As a result of the process of executing feature point generation 54, a feature track process 61, scene structure modeling process 62, camera modeling process 63, or other image processing techniques may be applied more readily than in the past.

Feature tracking 61 may, for example, estimate the path or "directional flow" of two-dimensional shapes across the sequence of image frames 50, or estimate three-dimensional paths of selected feature points. The camera modeling processes 63 may estimate the camera paths in three dimensions from multiple feature points.

Considering the scene structure modeling 62 more particularly, the sequence 50 of images 51-1, and 51-2, ..., 51-F is taken from a camera that is moving relative to an object. Imagine that we locate P feature points 52 in the first image 51-1. Each feature point 52 corresponds to a single world point, located at position sp in some fixed world coordinate system. This point will appear at varying positions in each of the following images 51-2, ..., 51-F, depending on the position and orientation of the camera in that image. The observed image position of point p in frame f is written as the two-vector up containing its image x- and y- coordinates, which is sometimes written as $(u_{fp}, V_{fp})$. These image positions are measured by tracking the feature from frame to frame using known feature tracking 61 techniques.

Figure 3:
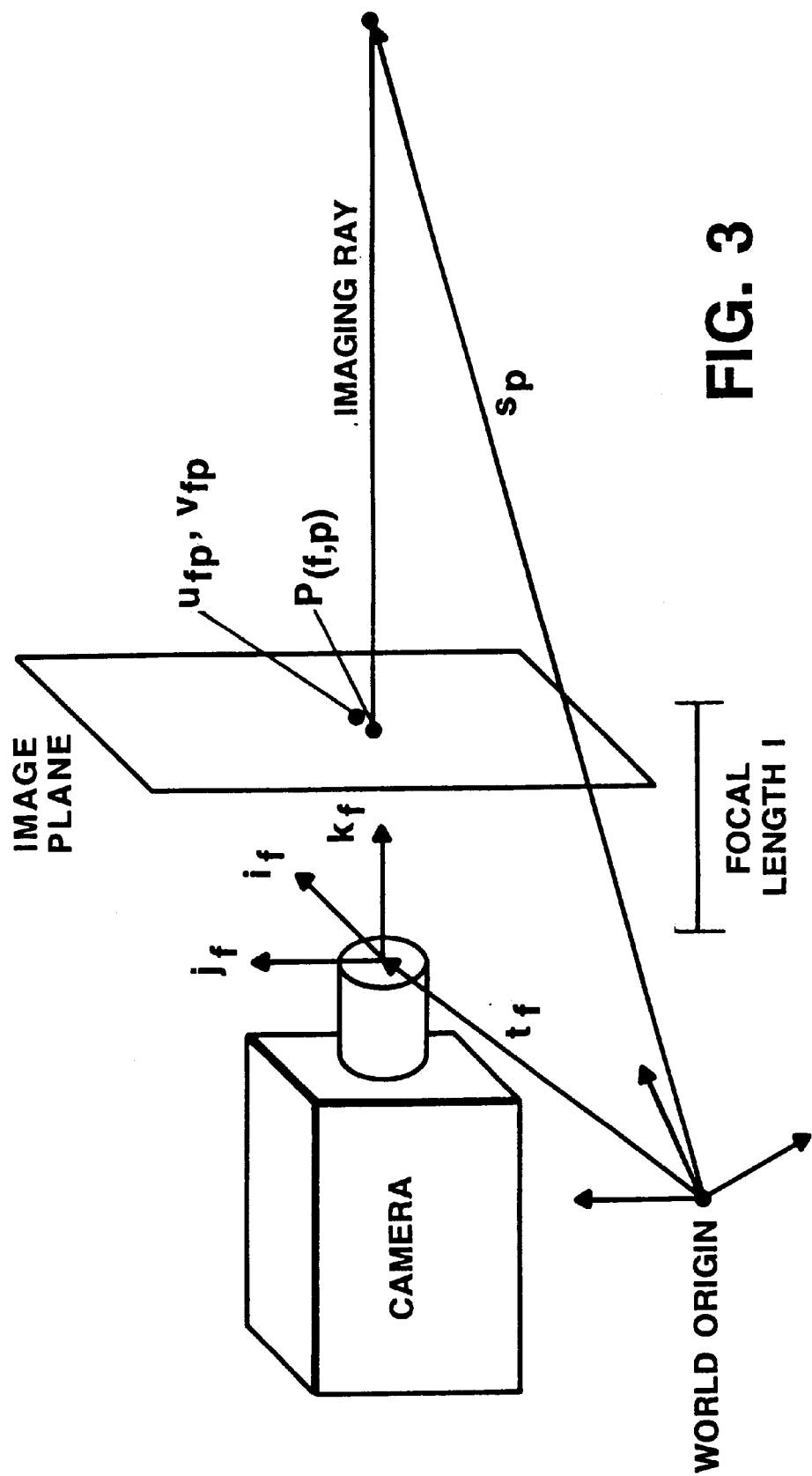
FIG. 3 is a view of a camera path and scene model parameter derivation from feature point tracks.

The camera position and orientation in each frame is described by a rotation matrix $R_f$ and a translation vector $t_f$ representing the transformation from world coordinates to camera coordinates in each frame. It is possible to physically interpret the rows of $R_f$ as giving the orientation of the camera axes in each frame—the first row $i_f$, gives the orientation of the camera's x-axis, the second row, $j_f$, gives the orientation of the camera's y-axis, and the third row, $k_f$, gives the orientation of the camera's optical axis, which points along the camera's line of sight. The vector tt indicates the position of the camera in each frame by pointing from the world origin to the camera's focal point. This formulation is illustrated in FIG. 3.

The process of projecting a three-dimensional point onto the image plane in a given frame is referred to as projection.

This process models the physical process by which light from a point in the world is focused on the camera's image plane, and mathematical projection models of various degrees of sophistication can be used to compute the expected or predicted image positions P(f,p) as a function of $s_p$, $R_p$, and $t_f$. In fact, this process depends not only on the position of a point and the position and orientation of the camera, but also on the complex lens optics and image digitization characteristics. These may include an orthographic projection model, scaled orthographic projection model, para-perspective projection model, perspective projection model, radial projection model, or other types of models. These models have varying degrees of mathematical sophistication and complexity, and account for the actual physics of image formation to increasingly accurate degrees.

The specific algorithms used to derive a scene structure 62 or camera model 63 are not of particular importance to the present invention. Rather, the present invention is concerned with a technique for efficiently developing a dense array of feature points 58 in a manner which can then be used by any one of a number of such algorithms.

In a dense feature array technique according to the invention, each image frame 51-x is represented as a pyramid 58 of filtered images starting from the original image 51-1, which provides the highest level of image detail, to successively coarser levels of detail. The pyramid filtering applied at each level 59 generates a reduced image, where each pixel represents a filtered neighborhood of source pixels from the next lower level 59 of the pyramid 58.

Figure 4:
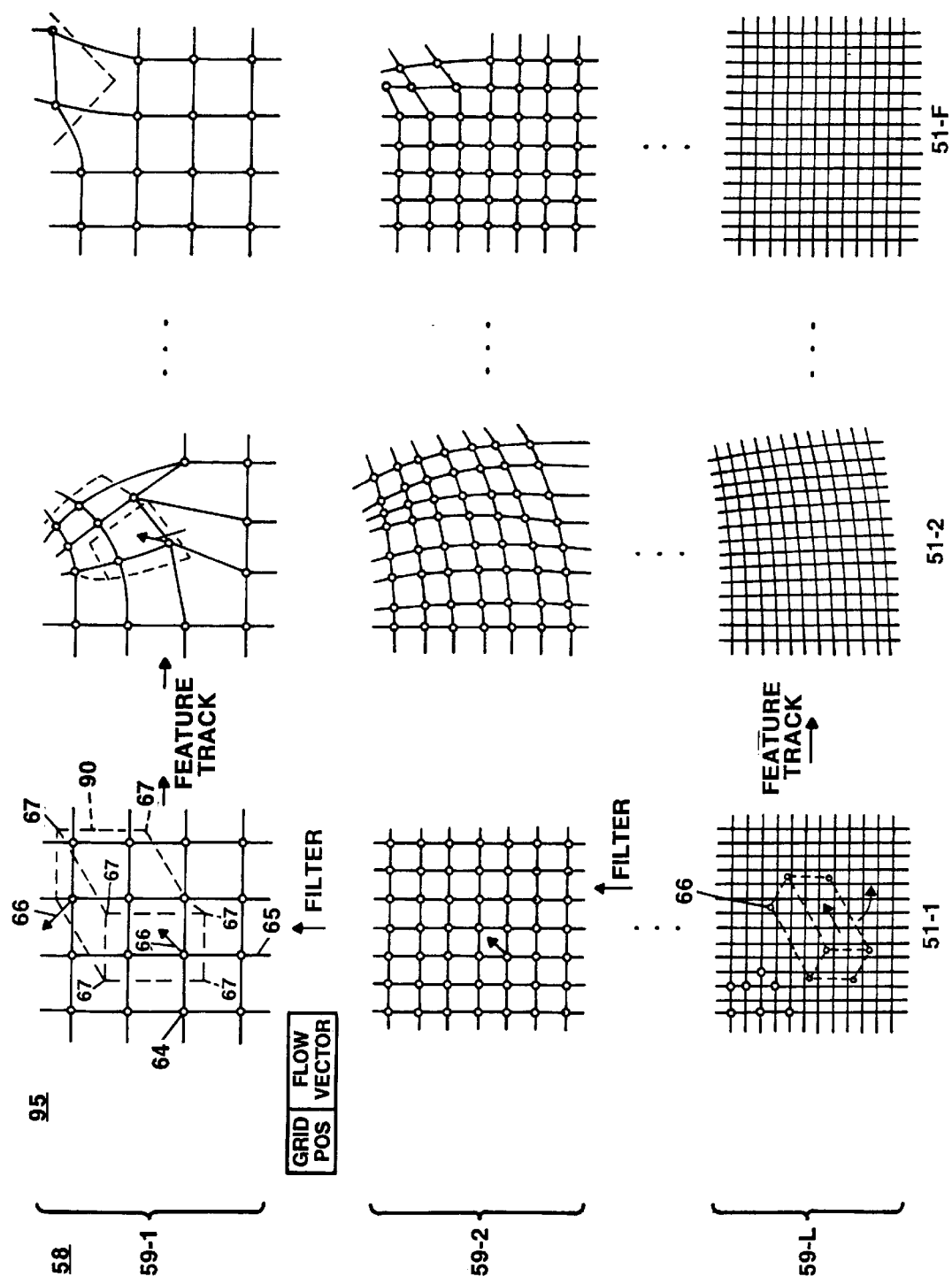
FIG. 4 is a diagram illustrating the details of one particular dense feature array for a rotating cube image.

FIG. 4 is a more detailed view of a typical image pyramid 58. The columns of pyramid represent successive images 51-1, 51-2, . . . , 51-F, whereas the rows in the pyramid represent the various levels 59-1, 59-2, . . . , 59-L.

At a lowest level 59-L, the pyramid 58 stores the pixel data as received from the image capture devices. For example, the images at the lowest level may be provided at a 640×480 image resolution. To obtain image data for the next level of the pyramid, filtering is successively applied to each original 640×480 pixel image 51 to yield for example, a 320×240 pixel image at a next higher level 59-L-1 (not shown in FIG. 4 for clarity), a 160×120 pixel image at a still higher level 59-L-2, a 80×60 image at a fourth level 59-2, and a 40×30 image at a highest level 59-1. The filtering technique applied can be a Gaussian filter, or other averaging and smoothing function.

A corresponding array 95 of feature point grids 65 is developed from the image pyramid 58. Each grid 65 in the feature point array 95 can be thought of as being overlaid onto the associated image. In the preferred method, the feature point grids 65 are aligned such that the nodes 64 in each grid 64 align with the centriods of the pixels 90 in the corresponding image 51 of the pyramid 58, but other orientations are possible.

It will be understood from the following discussion that the nodes of the feature point array 95 are considered to each have a corresponding pixel 90, but in other embodiments, there may or may not be a point or a node 64 associated with each pixel 90.

The feature array 95 stores a number of associated image features as an entry 60. For example, each entry 60 in the feature array 95 contains at least a grid position (GRID POS) and a flow vector (FLOW).

Data for the feature array 95 is developed by applying a feature tracking algorithm at each level of the image pyramid 58, starting with the ton level 51-1 (fewest pixels, coarsest resolution). Turning attention to the first image 51-1 and its top level 59-1, a first grid 65-1-1 of feature points 64 is defined. In this first image of the series, this grid 65-1-1 starts with a regular pattern of feature points 64 evenly distributed over the source image and placed at pixel centroids. The feature points 64 are placed in the regular grid arrangement, regardless of the actual structure of objects in the image stream 50.

Consider an example where the image stream 50 contains images of a rotating cube 88 against a uniform dark background. The visual corners 67 of the cube 88 are what is traditionally detected and tracked in feature tracking algorithms. In contrast to this, in the invention, the feature points 64 do not correspond to visual features of the images 51, but rather are in a predefined regular structural order, such as the rectangular grid 65 shown.

The GRID POS data for each feature point 64 is thus stored as the (x,y) position of the feature point 64 within the grid 65.

As the image stream progresses, a subsequent image 51-2 results in the generation of a entry corresponding to the highest level representation of the second image in the sequence, such as the image shown in the pyramid 58 at row 59-1, column 51-2. Here, as the cube rotates to a different position as shown, a corresponding movement of the feature points 64 results in deformation of the associated grid 65-1-2.

To obtain the grid positions of the feature points 64 in this subsequent entry 60-1-2 of the feature array 95, a feature tracking process is performed between the successive pairs of images 51-1 and 51-2 at the highest pyramid level 59-1.

Therefore, across each image pair at a given pyramid level 59, a sub-pixel directional flow vector is generated for each feature point 64. The vectors are generated between the first 51-1 and second image 51-2, then the second 51-2 and third 51-3 image. This continues on a pair-wise basis through all the images in the sequence.

Each feature point 64 thus has a corresponding flow vector 66, which determines the sub-pixel locations of the feature points in the next successive image at that pyramid level 59. Data representing the flow vector for each feature point 64 is stored in the FLOW VECTOR entries 60 in each grid 65 of the feature array 95. A given directional flow vector 66, for example, associated with the second image 51-2, may have a different magnitude and direction as the speed and direction of the cube changes.

This process is then repeated for the next lower level 59-2 of the pyramid 58, beginning with a new regular grid 65-1-2 of feature points 64. At the lowest level 59-L, it is possible that the grid 65-1-L a feature point is associated every other pixel of the source image 51-1, or it may be that other regular patterns, such as every other pixel, are used.

As the image sequence progressed, the feature point grid 65 for a given pyramid level 59 therefore translates and deforms across the successive images 51-2, . . . , 51-F, based on the generated directional flow vectors. As with any feature tracking method, some feature points 64 will eventually be lost between images due to imaging artifacts, noise, occlusions, or similar factors. For example, by the time image 51-F is reached, the cube 88 has rotated just about out of view.

As such, these feature points 64 are tracked until they are lost, for use in any algorithm which might, for example, be employed to derive a depth map or surface mesh for the cube.

Because the feature points in the dense feature array 58 are defined as a grid 65, the directional flow of feature points within grid borders can be interpolated from their neighbors' directional flows. This interpolation process can continue until either a "lost" feature point has been regained, or it is determined that the feature point is no longer reliable. Nearest neighbor interpolation of directional flows can also be used as a predictive technique to constrain the matching process between a feature point in one image with multiple potential matching feature points in the next successive image.

Feature points 64 can also become unreliable when they "collide" as the grid 65 deforms. The algorithm can either attempt to resolve the ambiguity based on directional flows of neighboring feature points, or simply merge these into a single feature point.

The feature point array becomes "dense" in the sense that it is eventually populated with flow vectors 66 for each pixel in one or more images of the sequence.

It should be understood however, that a given flow vector may be interpolated to represent, for example, the directional flow vector 66 for a region of up to 4×4 surrounding pixels at the lowest level 59-L. Grid interpolation, based on directional flow, can thus be applied to generating these purely interpolated feature points 64. Interpolated feature paths can be used in smoothing the contours between the computed directional flows of feature points 64. This type of smoothing is extremely useful in applications that estimate parameters of a visual scene by correlating between the tracking paths of multiple feature points 64 (e.g. tracking shapes, estimating camera paths, recovering estimated three-dimensional structure of a visual scene from feature tracking data).

Directional flow algorithms can be very computationally expensive compared to interpolation, so considerable performance improvements can be realized by substituting interpolation for direct computation of directional flow. For example, every other feature point 60 in the grid could be a computed feature point while the remaining feature points are interpolated. The dense feature array method maintains the distinction between computed and interpolated feature points, since computed feature points are more reliable than interpolated ones.

As a given grid 65 translates and deforms, image coverage also migrates across the successive images. Some areas of successive images will have overly dense coverage, some overly sparse coverage, and some areas will have no coverage at all. The dense feature array method can dynamically generate new feature points in the grids 65, or collapse multiple "overcrowded" feature points into a single feature point.

In this way, the dense feature array method can continuously add new feature points in successive images while avoiding the computational expense of tracking an overly dense set of feature points in other areas of the image.

The directional flow vectors 66 are derived from a process that searches for matches between each feature point 64 in the source image (the first of the two images being matched) and an array of candidate target feature points calculated from the target image (the second image in the pair). The matching process is based on the feature point's "signature": a set of computed values that characterize the feature point 64. Examples of signature functions include the gradient and the total illumination in the area around the feature point.

Signature values are computed across the local neighborhood of pixels that surround the feature point's 64 sub-pixel location in the image. This makes the matching process less sensitive to individual pixel variations. These values can be computed with a pixel weighting function over the local pixel neighborhood. This allows weighting of each pixel in the neighborhood based on its distance from the from the feature point's sub-pixel location, and can include a negative weight applied to outlying pixels.

In some cases, weighting is implemented by a simple linear function. A weighting function can also be described as a function curve where X is the distance from the feature point location and Y is the weighting factor. A representative weighting function curve would be symmetric around the Y axis, with its peak at X=0, smoothly dropping off as X increases (and decreases), and dipping below zero as X approaches the maximum distance from the feature point location.

Using the signature computed for each feature point 64 in the source image, a search can be made for a matching candidate feature point in the target image. The determination of a match is based on comparison of each set of signature values, applying an optional weighting factor to different elements of the signature. While the search for each matching feature point can be an exhaustive search, there are several additional sources of initial estimates and/or constraints on the matching process.

These include:
- the estimated difference between camera position in the two images being matched;
- the directional flow computed for adjacent feature points in the grid; or
- the flow vectors previously computed at a higher level of granularity in the pyramid.

Estimates of differences in camera position can be based on a priori knowledge of camera positions, assumptions of maximum camera movement between image frames, or a separate computation of estimated camera path. When stereo or multi-baseline stereo cameras are used, a good a priori estimate of relative camera positions is often available. In time-based sequences of images, estimates of the maximum camera movement between frames or estimated camera paths can help constrain the matching process between feature points.

The use of directional flow from adjacent feature points 64 in the grid is based on an assumption of local correlation of directional flow between adjacent pixel neighborhoods. This correlation is often present in a series of successive images 51, and provides a reasonable basis for governing the search process. When a dominant directional flow can be computed over the entire grid, this can be used as the basis for estimating relative positions of the camera between successive images.

The dense feature array method uses image pyramids 58 to constrain the feature point matching process in lower levels 59 of the pyramid 58. At each successive lower level in the pyramid, there is a proportionally higher density of feature points 64 tracked across the images 51. These are defined as a feature point grid on the first image 51-1, similar to the higher level's initial grid but more finely spaced. Like the grid at the higher level, this grid migrates and deforms across successive images to reflect the directional flow of the feature points 64. Also like the grid at the higher level, the grid at the lower level can add new feature points in sparsely populated areas of the image or collapse feature points in densely populated areas.

Using the pyramid 58, directional flow vectors at a higher level can guide the search process at the next lower level. Each higher level directional flow vector is projected onto the corresponding image at the next lower level. The area surrounding this flow vector defines a constrained search region for matching feature points 64 inside that region at the lower level. The matching feature point 64 in the target image should be within the constrained search region at that lower level. This is because the flow vector at the higher level is defining the overall directional flow within that area, and the corresponding flow vectors at the lower level are essentially providing refinements of that flow.

This process of successive refinement of feature points and flow vectors continues down the pyramid 58, with each array of flow vectors at the higher level providing initial estimates for feature point tracking at the next lower level. At the bottom of the pyramid 58, this process yields a dense array of feature points 64 and their paths across the series of images 51. The density of feature points 64 at the lowest level can be per-pixel, if required. This dense array can include a mix of interpolated and computed feature points.

The process as defined is composed of multiple sequential steps. Many of these steps can be executed in several different orders without altering the results. For example, the computation of directional flow vectors can either go across a series of images and then down the pyramid, or be done with image pairs down the pyramid and then across to successive images. This flexibility provides multiple opportunities for parallelism in the implementation of this method, including the use of specialized hardware accelerators with parallel processing capabilities. Since the directional flow vectors are computed across image pairs, there is also the opportunity for pipelined and/or real-time processing using the dense feature array method.

Figure 5:
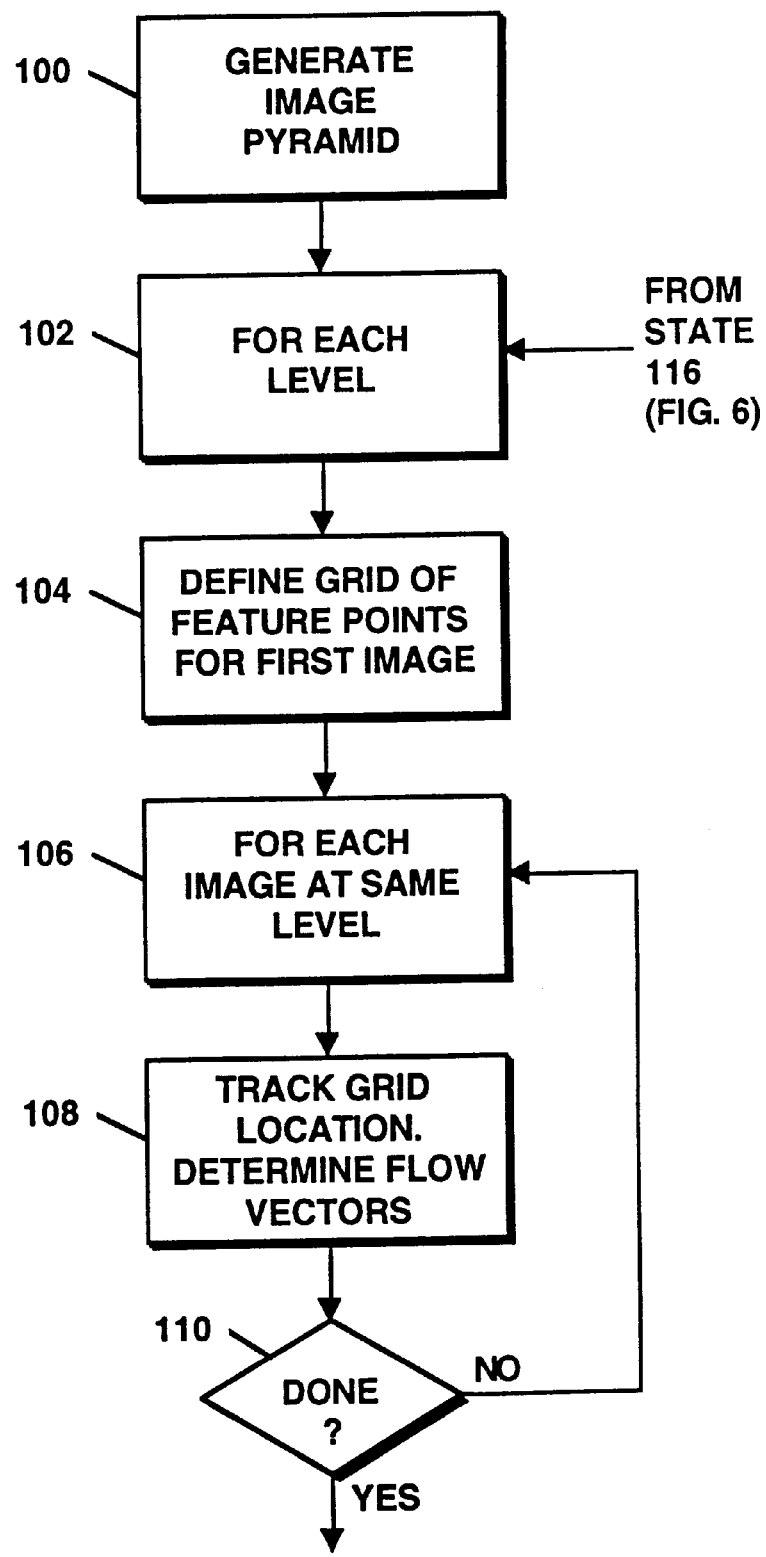
FIG. 5 and 6 are flow diagrams of a sequence of steps performed by the image processing system to develop the dense feature array.
Figure 6:
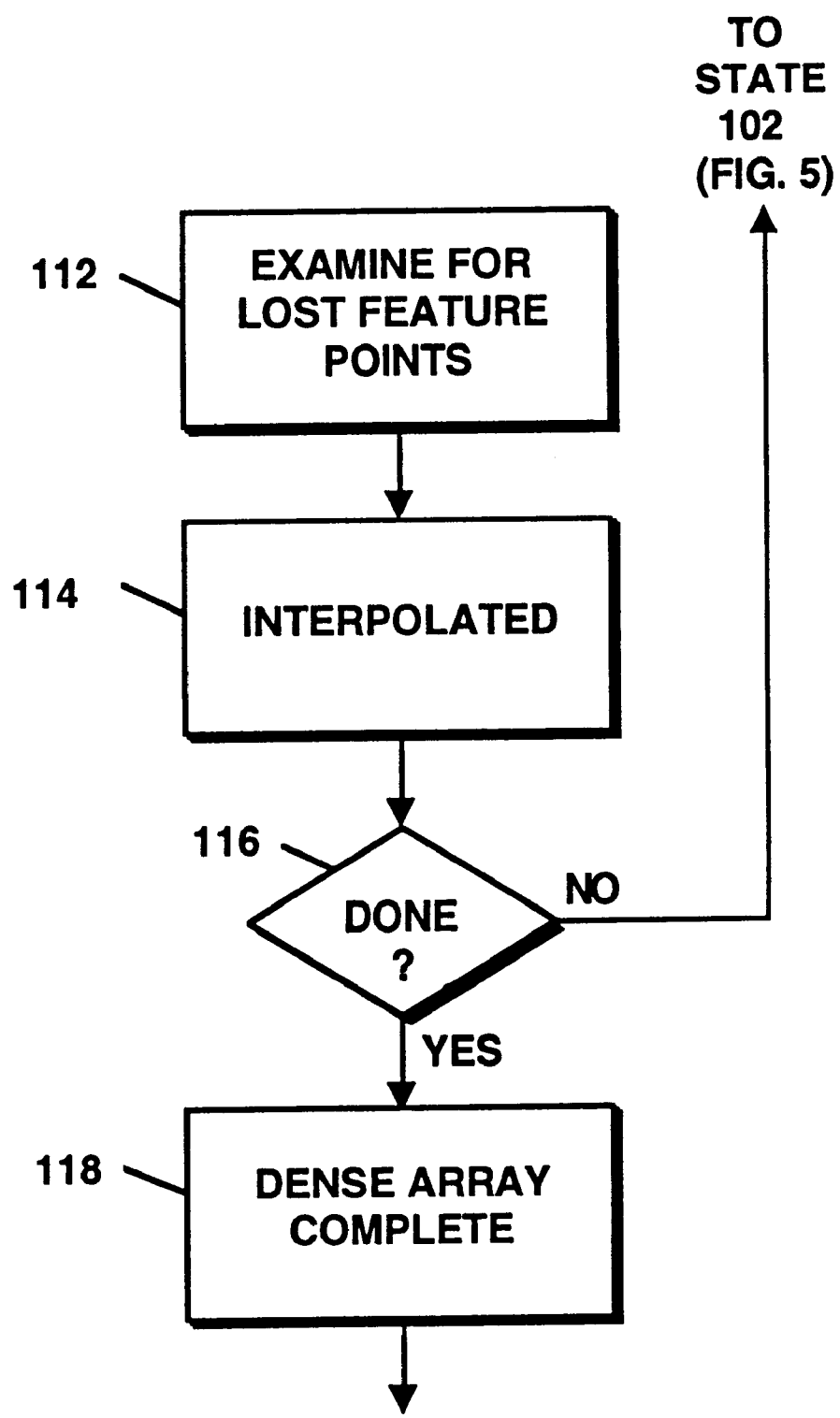

One implementation of the feature point generation process 54 is shown more particularly in FIGS. 5 and 6. In a first state 100, the image pyramid 58 is generated in a manner previously described in connection with FIG. 4. In a next state 102, for each level 59 of the pyramid 58 and starting at the top of level 59-1, a sequence of states is entered into.

The first state in this sequence, state 104, establishes the grid of feature points in the first image at the given level. As previously described, this is initially set to some regular grid pattern preferably such as at the centroid of every pixel position or the centroid of every other or every third pixel position.

In a next state 106, a sequence of steps is performed whereby each of the images in the sequence 50 are examined at the same level 59-1 of the pyramid. The grid locations are tracked at that level and the matrix of directional flow vectors is stored in the grid.

In state 110, if this process is not yet complete it returns to state 106 until directional flow vectors are generated for each of the images at the same level. In state 110 if each of the images at the pyramid have been processed, then processing proceeds to state 112 of FIG. 6 in which the matrices at the given level are examined for lost feature points. If lost feature points are determined such as by comparing the directional flow vectors, the flow vector values may be interpolated in state 114 as previously described.

In state 116, if not all levels of the pyramid have been yet processed, the procedure iterates to a state 102 where a next level in the pyramid is processed. If the processing is complete in state 106 then in state 118 the dense array of feature points is then available to be used by further image processing algorithms as already described.

Figure 7:
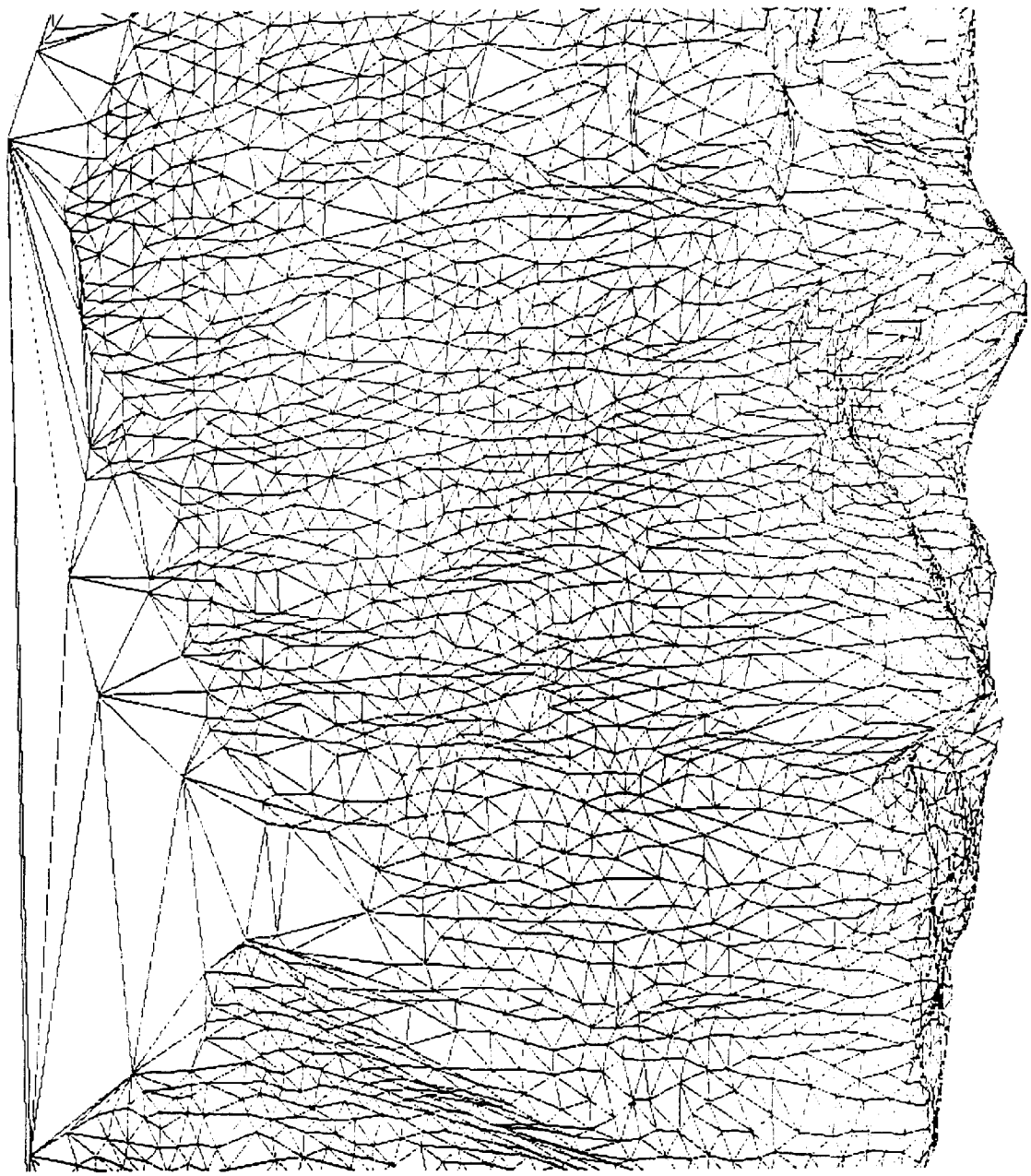
FIG. 7 is a surface mesh for a human face developed using a dense feature array according to the invention.

FIG. 7 is a surface mesh which was generated using the teachings of this invention. A series of images of a human head were taken by moving the camera around the person's face at a continuous sequence of angles. An dense feature array was developed from these images and then fed to a camera movement and surface mesh modelling algorithm such as described in Poelman, C. J., "The Paraperspective and Projective Factorization Methods fpr Recovering Shape and Motion", Carnegie Mellon University, School of Computer Science Report CMU-CS-95-173 dated Jul. 12, 1995.

Figure 8:
FIG. 8 is a texture map of a source image of the face onto the surface mesh.

A texture map of a source image onto the model in FIG. 8 shows the level of precision achievable. Subsequent experiments have demonstrated even higher levels of precision.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for deriving an array of feature points from a sequence of input images of a three dimensional structure of a scene, comprising the steps of:
   (a) forming an image pyramid from the image sequence, with images at a bottom level of the pyramid representing the image at a relatively high level of resolution, and images at subsequently higher levels of the pyramid representing filtered and reduced versions of the images, to provide representations of each image in the sequence of images at multiple resolutions;
   (b) at each level of the pyramid, determining an initial grid of nodes for the first image in the sequence, the grid being composed of a regularly spaced array of nodes, the nodes associated with locations in space that are independent of, and at a higher resolution than the locations of specific pixels in the input image sequence, and the grid associated with the highest level of resolution being a dense array;
   (c) tracking the nodes of a selected grid of nodes among successive images in the sequence at a given level of the pyramid using a feature tracking function that determines a motion path for at least a selected set of nodes from image to image and storing such motion paths as grid node tracking information; and
   (d) using the grid node tracking information within the pyramid as an array of feature points and associated image tracking data in a subsequent image processing algorithm to determine aspects of the three-dimensional structure of a scene from which the image sequence was captured.

2. A method as in claim 1 additionally comprising the step of:
   using the grid to interpolate feature points between successive images at a given level of the pyramid.

3. A method as in claim 1 wherein flow vectors are determined for feature points in the grids for successive images at the same level in the pyramid.

4. A method as in claim 1 additionally comprising the step of:
   using the grid of feature points in an image processing algorithm which determines aspects of the three dimensional structure of a scene from which the image sequence was captured.

5. A method as in claim 1 wherein the sequence of images is obtained by moving a camera around a scene, the method additionally comprising the step of:

building a scene model which incorporates new feature points added to the grid from successive images and supplying these feature points to an image processing algorithm for deriving the scene model.

6. A method as in claim 1 wherein feature points are added to and removed from the grid as the tracking step proceeds through successive images.

7. A method as in claim 6 additionally comprising the step of:

using the grid of feature points in a factorization method for determining scene structure.

8. A method as in claim 1 wherein a hardware accelerator is used to perform the steps of the method.

9. A method as in claim 1 wherein the steps are performed in real time, as the image sequence in acquired.

10. A method as in claim 1 wherein the feature points in a grid are located at pixel centroids of a corresponding image.

11. A method as in claim 1 wherein step (d) additionally comprises the step of using the grid node tracking information derived at a higher level of pyramid to constrain image tracking data located at a lower level of the pyramid.

12. A method as in claim 11 wherein the constrained image tracking data is located at a next lower level of the pyramid.

* * * * *

UNITED STATES PATENT AND TRADEMARK OFFICE
CERTIFICATE OF CORRECTION

PATENT NO. : 6,192,156 B1
DATED : February 20, 2001
INVENTOR(S) : Philip R. Moorby It is certified that error appears in the above-identified patent and that said Letters Patent is hereby corrected as shown below:

<u>Column 10,</u>
Lines 25-27, delete "of a three dimensional structure of a scene";
Line 39, insert "pixel" before locations; and
Line 39, replace "pixels" with "pixel locations".

Signed and Sealed this

Fourth Day of September, 2001

Attest:

*Nicholas P. Godici*

NICHOLAS P. GODICI
*Attesting Officer*     *Acting Director of the United States Patent and Trademark Office*